(12) United States Patent
Marsh et al.

(10) Patent No.: US 8,682,468 B2
(45) Date of Patent: *Mar. 25, 2014

(54) SYSTEMS AND METHODS FOR DUPLICATING KEYS

(71) Applicant: KeyMe, Inc., Long Island City, NY (US)

(72) Inventors: Gregory Marsh, Granite Bay, CA (US); Kristopher Borer, New York, NY (US); Zachary Salzbank, Port Washington, NY (US); Jayeon Kim, Bayside, NY (US); Paige Pruitt, Half moon Bay, CA (US)

(73) Assignee: KeyMe, Inc., Long Island City, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/734,032

(22) Filed: Jan. 4, 2013

(65) Prior Publication Data

US 2013/0173044 A1 Jul. 4, 2013

Related U.S. Application Data

(60) Provisional application No. 61/582,990, filed on Jan. 4, 2012, provisional application No. 61/602,456, filed on Feb. 23, 2012, provisional application No. 61/656,832, filed on Jun. 7, 2012, provisional application No. 61/683,794, filed on Aug. 16, 2012, provisional application No. 61/691,396, filed on Aug. 21, 2012.

(51) Int. Cl.
*G06F 19/00* (2011.01)

(52) U.S. Cl.
USPC ............ 700/186; 700/161; 700/117; 700/106

(58) Field of Classification Search
None
See application file for complete search history.

(56) References Cited

U.S. PATENT DOCUMENTS

| | | | |
|---|---|---|---|
| 5,127,532 A | 7/1992 | Cimino et al. | |
| 5,351,409 A | 10/1994 | Heredia | |
| 5,545,286 A * | 8/1996 | Schaupp | ........................ 156/570 |
| 5,617,323 A | 4/1997 | Stansberry et al. | |
| 5,711,643 A | 1/1998 | Parr et al. | |
| 5,807,042 A | 9/1998 | Almblad et al. | |
| 5,908,273 A | 6/1999 | Titus et al. | |
| 6,064,747 A | 5/2000 | Wills et al. | |

(Continued)

FOREIGN PATENT DOCUMENTS

WO WO/2012/170321 12/2012

OTHER PUBLICATIONS

Keystone 600N5, Keystone 600N5 Training Manual, Stanley Security Solutions, Issue 3, Mar. 2007.*

(Continued)

*Primary Examiner* — Kavita Padmanabhan
*Assistant Examiner* — Christopher E Everett
(74) *Attorney, Agent, or Firm* — Byrne Poh LLP

(57) ABSTRACT

Systems and methods for duplicating keys are provided. In some embodiments, a systems for creating keys are provided, the systems comprising: at least one hardware processor that: receives security information from a user; and receives geometric information about a first key associated with the security information from a storage device; and a key shaping device that creates a second key using the geometric information.

36 Claims, 13 Drawing Sheets

(56) References Cited

U.S. PATENT DOCUMENTS

| | | | |
|---|---|---|---|
| 6,065,911 | A | 5/2000 | Almblad et al. |
| 6,152,662 | A | 11/2000 | Titus et al. |
| 6,175,638 | B1 | 1/2001 | Yanovsky |
| 6,185,311 | B1 | 2/2001 | Yanovsky et al. |
| 6,406,227 | B1 | 6/2002 | Titus et al. |
| 6,449,381 | B1 | 9/2002 | Yanovsky et al. |
| 6,543,972 | B1 | 4/2003 | Cimino |
| 6,588,995 | B2 | 7/2003 | Wills et al. |
| 6,647,308 | B1 | 11/2003 | Prejean |
| 6,687,565 | B2 | 2/2004 | Wetterlin et al. |
| 6,801,829 | B2 | 10/2004 | Kawai |
| 6,836,553 | B2 | 12/2004 | Campbell et al. |
| 6,839,449 | B1 | 1/2005 | Campbell et al. |
| 6,839,451 | B2 | 1/2005 | Campbell et al. |
| 6,895,100 | B1 | 5/2005 | Pacenzia et al. |
| 7,849,721 | B2 | 12/2010 | Bass et al. |
| 7,890,878 | B2 | 2/2011 | Bass et al. |
| 7,891,919 | B2 | 2/2011 | Bass et al. |
| 8,059,883 | B1 * | 11/2011 | Watts .......................... 382/141 |
| 8,074,481 | B2 | 12/2011 | Bass et al. |
| 8,128,322 | B2 | 3/2012 | Bass et al. |
| 2002/0191849 | A1 * | 12/2002 | Campbell et al. ............ 382/181 |
| 2007/0003388 | A1 | 1/2007 | Doong |
| 2007/0198287 | A1 | 8/2007 | Outwater |
| 2008/0145163 | A1 | 6/2008 | Freeman et al. |
| 2009/0074528 | A1 | 3/2009 | Hadad |
| 2010/0217427 | A1 * | 8/2010 | Gray et al. ..................... 700/117 |
| 2010/0217428 | A1 * | 8/2010 | Strong et al. ................. 700/117 |
| 2010/0278437 | A1 | 11/2010 | Thompson et al. |
| 2010/0278438 | A1 | 11/2010 | Thompson et al. |
| 2011/0167377 | A1 | 7/2011 | Bass et al. |
| 2011/0176881 | A1 | 7/2011 | Bass et al. |
| 2011/0262240 | A1 | 10/2011 | Mutch et al. |
| 2011/0297691 | A1 | 12/2011 | Freeman |
| 2011/0301738 | A1 | 12/2011 | Freeman |
| 2012/0038453 | A1 | 2/2012 | Bass et al. |
| 2012/0084182 | A1 | 4/2012 | Bass et al. |
| 2013/0017030 | A1 | 1/2013 | Freeman et al. |

OTHER PUBLICATIONS

Keys Can be Copied From Afar, Jacobs School Computer Scientists Show, Daniel Kane, Oct. 30, 2008.*
"Reconsidering Physical Key Secrecy: Teleduplication via Optical Decoding," by Benjamin Laxton, Kai Wang, and Stefan Savage from the Department of Computer Science and Engineering at UC San Diego's Jacobs School of Engineering. ACM CCS 2008, Alexandria, VA, Oct. 2008.*
Key & Core Control, Keystone 600N5, Stanley Security Solutions, 2006.*
MasterKing, for Development of Superior Master Keying Systems, hpcworld, 2005.*
KeyTrail, for Complete Management of Keys, Personnel & Locations, hpcworld, 2005.*
Blue Shark Computerized Key Cutter, 2006.*
KeyStone 600N5, Network Key Management Software, Stanley Security Solutions, Aug. 2006.*
LockViewer.com, Core, Lock and Key Management Software, 2009.*
International Search Report in International Patent Application No. PCT/US2013/020231, filed Jan. 4, 2013, mailed Mar. 14, 2013.
Written Opinion in International Patent Application No. PCT/US2013/020231, filed Jan. 4, 2013, mailed Mar. 14, 2013.
Motorola, "Motomanual: Motoming A1200", 2007.
International Patent Application No. PCT/US2007/024522, filed Nov. 28, 2007.
U.S. Appl. No. 13/743,053, filed Jan. 16, 2013.
U.S. Appl. No. 60/867,403, filed Nov. 28, 2006.
U.S. Appl. No. 60/867,796, filed Nov. 30, 2006.
Harris, C., and Stephens, M.J., "A Combined Corner and Edge Detector", In Proceedings of the Alvey Vision Conference (AVC '88), Manchester, U.K., Aug. 31-Sep. 2, 1988, pp. 147-152.
Notice of Allowance dated Oct. 31, 2013 in U.S. Appl. No. 13/734,064.
Otsu, N., "A Thresholding Selection Method from Gray Level Histogram," In Proceedings of the IEEE Transactions on Systems, Man, Cybernetics (SMC '79), Jan. 1979, pp. 62-66.

* cited by examiner

SYSTEMS AND METHODS FOR DUPLICATING KEYS

CROSS-REFERENCE TO RELATED APPLICATIONS

This application claims the benefit of U.S. Provisional Patent Application No. 61/582,990, filed Jan. 4, 2012, U.S. Provisional Patent Application No. 61/602,456, filed Feb. 23, 2012, U.S. Provisional Patent Application No. 61/656,832, filed Jun. 7, 2012, U.S. Provisional Patent Application No. 61/683,794, filed Aug. 16, 2012, and U.S. Provisional Patent Application No. 61/691,396, filed Aug. 21, 2012, which are hereby incorporated by reference herein in their entireties.

TECHNICAL FIELD

The disclosed subject matter relates to systems and methods for duplicating keys.

BACKGROUND

A lock and key are used as one way of limiting access to places (e.g. homes, places of business, storage, etc.) and other types of property (e.g., vehicles, etc.) to a person in possession of a key that can operate the lock. A problem arises when a person who would normally be authorized to enter or use the property protected by the lock does not have physical access to the appropriate key. For example, if a user locks themselves out of their home with the key inside, they cannot gain access to the home because they do not have access to the key. As another example, if a user loses a key to a safe, the user cannot access property that may be inside the safe. One way that users solve the problem is by calling a skilled locksmith that is able to open the lock without a key and/or is able to create a new key for the lock without using an existing key as a template. However, skilled locksmiths are expensive and may not be readily available when the user is in need. Another way that users solve the problem is by hiding a copy of an important key in a place that is not secure, such as under a doormat or in a fake rock placed somewhere accessible by the user. This presents a security risk as a person other than the user can use the hidden key to gain access to the lock.

Therefore, there is a need for mechanisms for duplicating keys that do not require the services of a skilled locksmith and are secure, among other things.

SUMMARY

In accordance with various embodiments of the disclosed subject matter, systems and methods for duplicating keys are provided.

In accordance with some embodiments, systems for creating keys are provided, the systems comprising: at least one hardware processor that: receives security information from a user; and receives geometric information about a first key associated with the security information from a storage device; and a key shaping device that creates a second key using the geometric information.

In some embodiments, systems for creating keys are provided, the systems comprising: a key receiver that receives a first key; a key scanner that captures geometric information about the first key; a hardware processor that determines a key type and bitting pattern of the first key based on the geometric information; and a key shaping device that creates a second key based on the key type and bitting pattern determined by the processor.

In some embodiments, methods for creating keys are provided, the methods comprising: receiving security information from a user; receiving geometric information about a first key associated with the security information from a storage device; and creating a second key using the geometric information.

In some embodiments, methods for creating keys are provided, the methods comprising: receiving a first key; scanning geometric information about the first key; determining a key type and bitting pattern of the first key based on the geometric information; and creating a second key based on the key type and bitting pattern determined by the processor.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

In accordance with various embodiments, systems and methods for duplicating keys are provided.

In some embodiments, these systems and methods allow a user to create a copy of a key. For example, a user can create a copy of a key if the key has been lost, if the user wishes to make a copy for a friend, or for any other suitable reason. In order to do so, in some embodiments, these systems and methods can detect a bitting pattern and a blank type of a user's key. This bitting pattern, blank type, and any other suitable information can then be stored in any suitable storage mechanism. At a suitable subsequent point in time (such as when the user has lost the key), these systems and methods can generate a duplicate of the key without the presence of the original key. This can be accomplished by retrieving the stored information from storage, selecting a blank key corresponding to the blank type, cutting the blank key according to the bitting pattern, and dispensing the key to the user. Any suitable security mechanisms can be included in these systems and methods to prevent unauthorized key duplication.

One of the uses of such systems and methods can be to provide a user with a way of creating a duplicate key when the original is not available, for instance during a lockout situation. Another use of these systems and methods can allow a user to obtain a duplicate key in a self-service fashion without assistance from, for example, a skilled locksmith or an employee at a hardware store that duplicates keys. Additionally, the systems and methods can be used to verify user identification through biometric scanning to provide a secure method for duplicating sensitive keys (e.g., a home key, a vehicle key, etc.).

Figure 1:
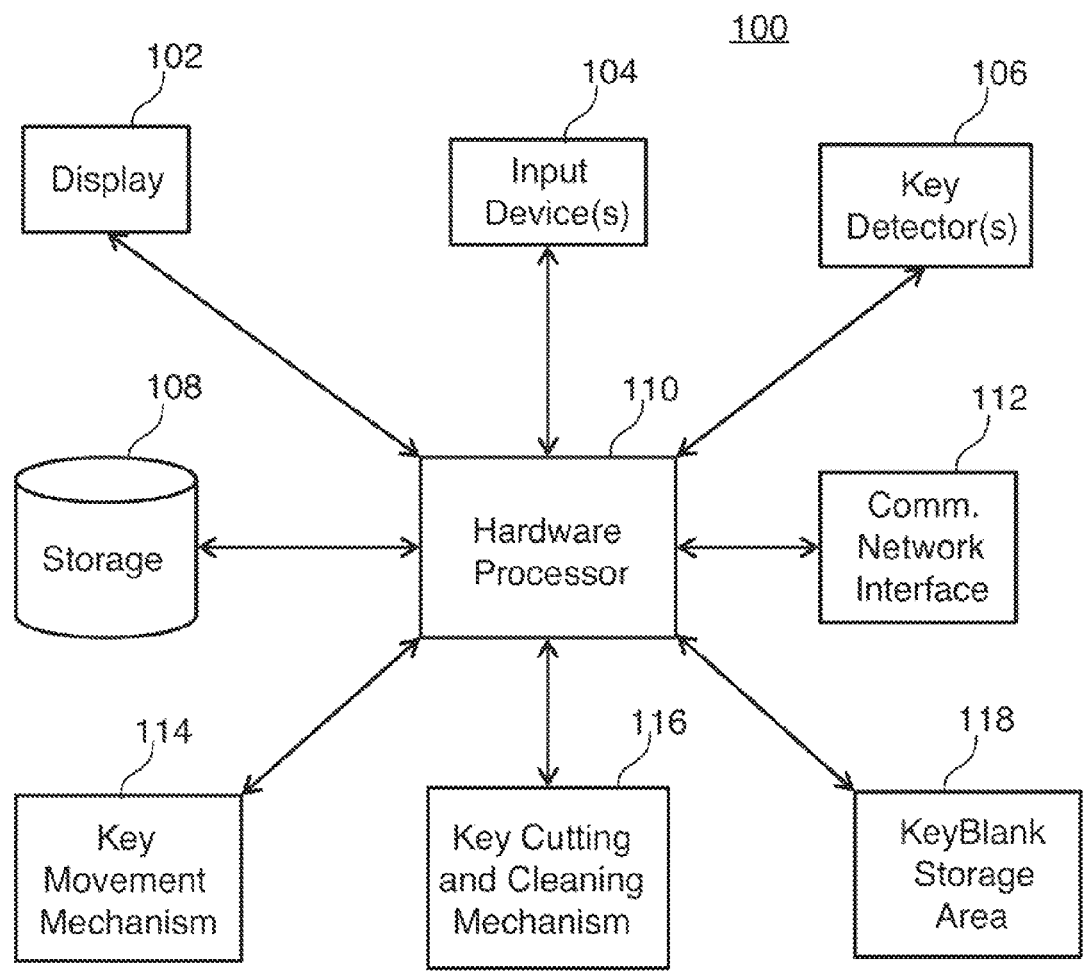
FIG. 1 shows an illustrative example of a schematic diagram of a system for duplicating keys in accordance with some embodiments of the disclosed subject matter.

Turning to FIG. 1, an example of hardware 100 that can be used in some embodiments is illustrated. As shown, hardware 100 can include a display 102, one or more input device(s) 104, one or more key detector(s) 106, storage 108, a hardware processor 110, a communication network interface 112, a key movement mechanism 114, a key cutting and cleaning mechanism 116, and/or any other suitable components.

Figure 2:
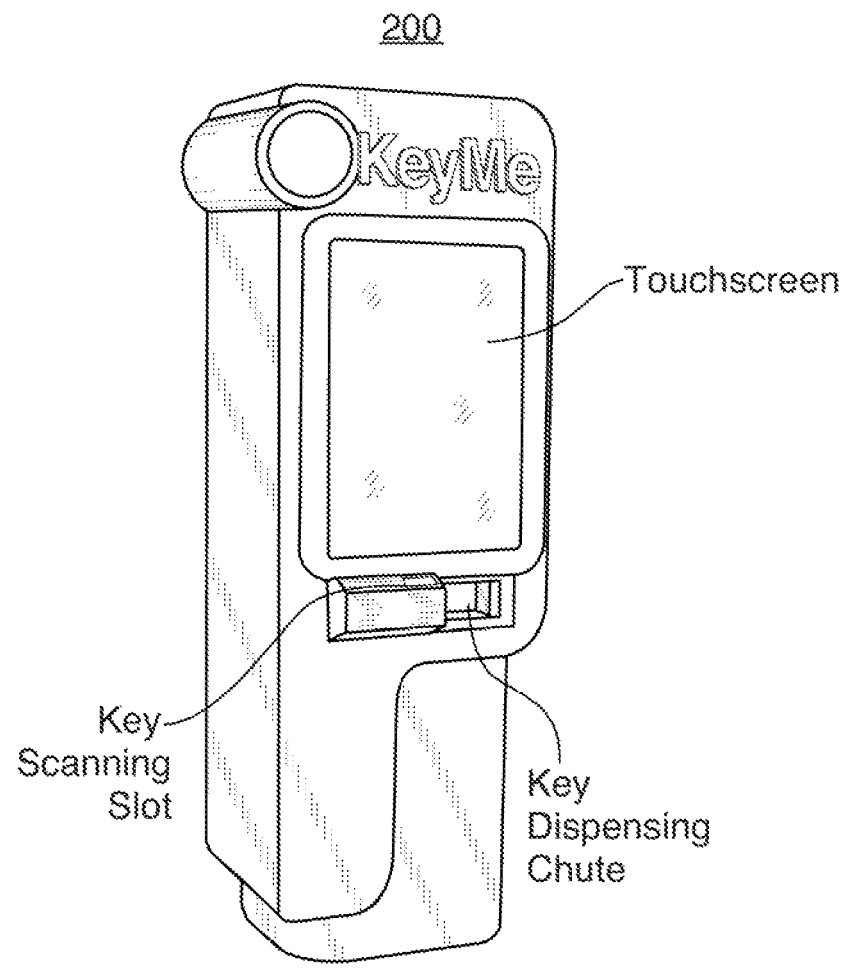
FIG. 2 shows an illustrative example of a perspective view of a kiosk for duplicating keys in accordance with some embodiments of the disclosed subject matter.

This hardware can be arranged in any suitable manner in some embodiments. For example, this hardware can be arranged in a kiosk, such as kiosk 200 of FIG. 2, in some embodiments.

In some embodiments, a subset of the hardware shown in FIG. 1 can be implemented in a scan-only kiosk that can be used to save a key template but not to create a key copy. For example, such a kiosk can omit mechanisms 114, 116, and 118 in some embodiments.

Display 102 can be any suitable display, such as an LCD display, a cathode ray tube display, an electronic paper display, etc. Input device(s) 104 can include any suitable input devices, such as a keypad, a keyboard, a fingerprint reader, an eye scanner (e.g., a retina or iris scanner), a touchpad, a credit card scanner, a smart card reader, a near field communication device, an RFID scanner, a touch sensor, a camera, a Quick Response code (QR code) reader, a barcode reader, etc. In some embodiments, display 102 and an input device 104 can be combined as a touch sensitive display (or touchscreen device).

Key detector 106 can be any suitable mechanism for detecting the bitting pattern and/or the blank type of a key. For example, the key detector can be any suitable device that detects the bitting pattern and/or blank type of a key using any suitable technology such as optical technologies, mechanical technologies, electrical technologies, and/or any other technology, as described further below. More generally, key detector 106 can detect geometric information about a key. For example, key detector 106 can detect the dimensions of a key (e.g., length, width, height, profile, shoulder shape, etc.) and features of the key. Examples of features of the key can include, but are not limited to, a bitting pattern, protuberances, dimples, voids, grooves, a milling profile, a milling pattern of the key from one or more side views, a milling pattern of the key from a front view (e.g., looking from the tip of the key toward the head of the key), etc.

In some embodiments, key detector 106 can detect the presence of an instruction to not duplicate the key. For example, such an instruction can be printed or engraved on a key by words, such as, "do not duplicate." As another example, such an instruction can be embedded in the key as an RFID chip, or the like. As another example, such an instruction can be indicated by the presence of a physical indication to not copy the key. For instance, a notch can be cut in the top of the key, or material can added to a portion of the key that is not inserted into a lock. In such embodiments, the presence of an instruction to not duplicate the key can cause the mechanisms described herein to inhibit scanning and/or duplication of the key as described herein.

Storage 108 can be any suitable storage. For example, storage 108 can be random access memory (RAM), electrically erasable programmable read only memory (EEPROM), flash memory, disk memory, network storage, a database, any other suitable storage, or any suitable combination thereof.

Hardware processor 110 can be any suitable processing hardware. For example, hardware processor 110 can be a microprocessor, a microcontroller, dedicated logic, a field programmable gate array, a general purpose computer, a special purpose computer, a client, a server, and/or any other suitable processing hardware.

Communication network interface 112 can be any suitable interface facilitating communications on a communication network. For example, communication network interface can be a wired network interface (such as an Ethernet network interface card (NIC), a USB interface, a cable television network interface, a telephone network interface, etc.), a wireless network interface (such as an IEEE 802.11x interface, a Bluetooth interface, a mobile telephone interface, a wireless data network interface, a satellite communications interface, etc.), an optical interface, and/or any other suitable interface.

Key movement mechanism 114 can be any suitable mechanism for moving a key from a key blank storage area 118 to key cutting and cleaning mechanism 116. For example, key movement mechanism 114 can include a key blank holding mechanism connected to one or more belts and/or stabilizer bars in which the position and operation of the gripper is controllable by hardware processor 110 and/or any other suitable mechanism. As another example, key movement mechanism 114 can be a robotic arm that is controllable by hardware processor 110 and/or any other suitable mechanism. Additionally or alternatively, as described in more detail below in connection with FIG. 11, key movement mechanism 114 can include a funnel and/or alignment mechanism that receives a key blank from a stack and positions the key blank to be moved to key cutting and cleaning mechanism 116.

In some embodiments, key blank storage 118 can house an inventory of any suitable number of types of key blanks (sometimes referred to herein as "blanks"). In some embodiments, keys of each blank type (e.g., key blanks with different milling patterns, key blanks of different sizes, etc.) can be stored in stacks within the storage area. Each stack can include any suitable number of blanks. Inventory levels of blanks can be monitored (locally or remotely) to keep track of how many key blanks are remaining in each stack. In some embodiments, each stack can have one or more sensors which can be used to determine how many blanks remain in the stack. In some embodiments, in response to sensing that the number of blanks in a stack (or the number of blanks of a certain type) has fallen below a threshold, a technician can be alerted and dispatched to add blanks. The technician can be alerted using any suitable communication method. For example, an email, a text message or a voice message can be sent to the technician. As another example, a message can be sent to the technician using a specialized application that includes software for managing inventory levels of key blanks.

In some embodiments, blanks can be removed from a stack as needed by key movement mechanism 114. For example, the magazines holding stacks of inventoried key blanks can be aligned vertically, in some embodiments. This can allow for key blanks to be fed to the bottom of the magazine by gravity as key blanks are removed by key movement mechanism 114. If the stacks are aligned vertically, the blank on the bottom of each stack can be removable by key movement mechanism 114. In an alternative example, if the stacks are aligned vertically, the blank at the top of each stack can be removable by key movement mechanism 114. In yet another example, key movement mechanism 114 can remove a blank from an arbitrary position in each stack. In some embodiments, stacks can be arranged in any suitable orientation, such as horizontally.

In some embodiments, a magazine can hold the stacks of inventories blanks. These magazines can be, for example, a storage and feeding device for holding a stack of inventory blanks. The magazines for holding the stacks of inventory can be made from any suitable material, such as: steel, aluminum, plastic, rubber, carbon fiber, etc. The magazines can be shaped to facilitate selection and removal of key blanks from the stack of blanks by key movement mechanism 114. In some embodiments, the magazines can be replaceable in a housing that houses hardware 100 to facilitate placement of blanks for use by allowing multiple keys to be placed at the same time. For example, if a technician is alerted that an inventory of a particular type of blank is below a threshold, the technician can refill the inventory of the particular type of blank.

Figure 9A:
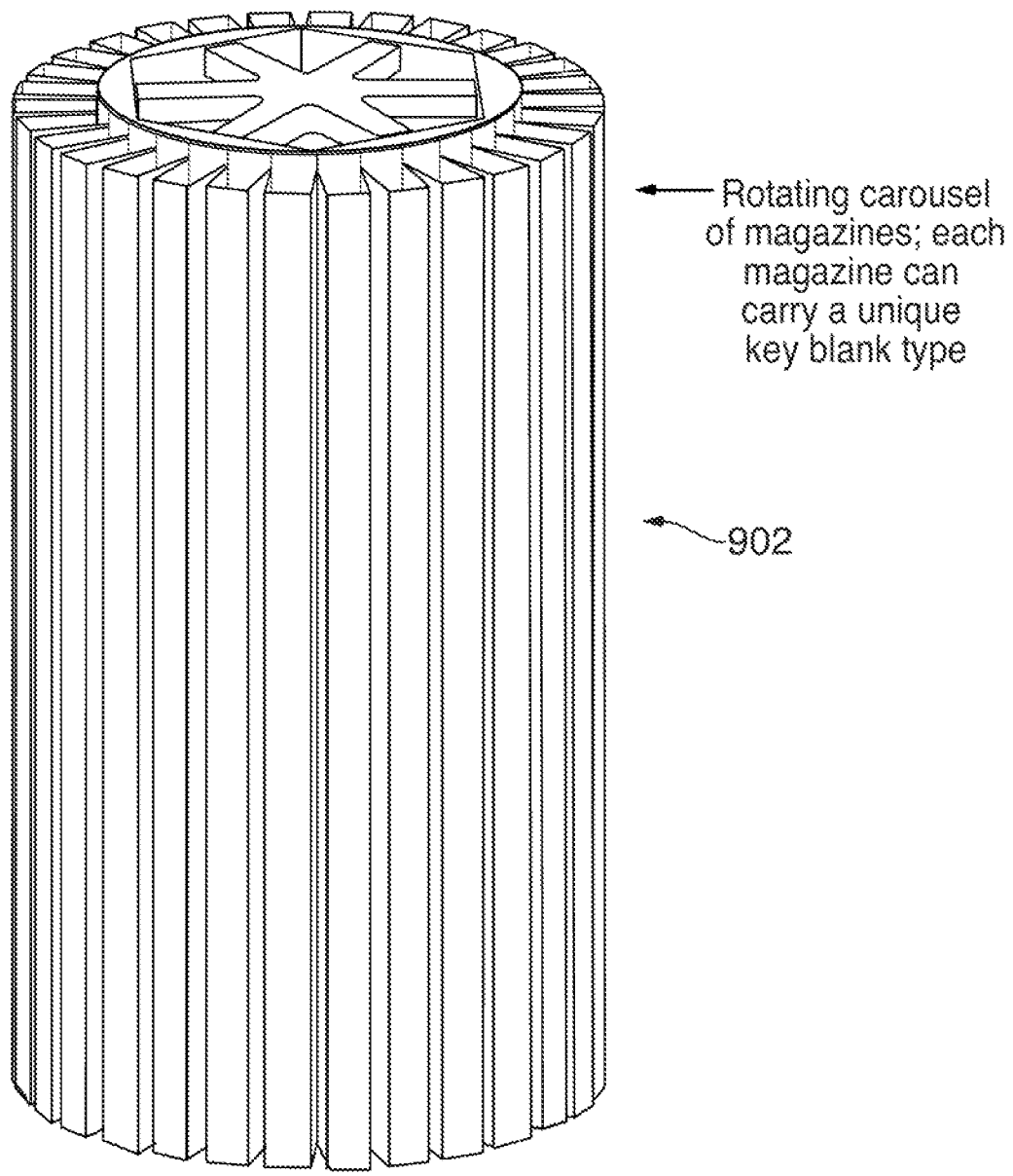
FIG. 9A shows an illustrative example of a rotating carousel of magazines for use in a key duplicating system in accordance with some embodiments of the disclosed subject matter.
Figure 9B:
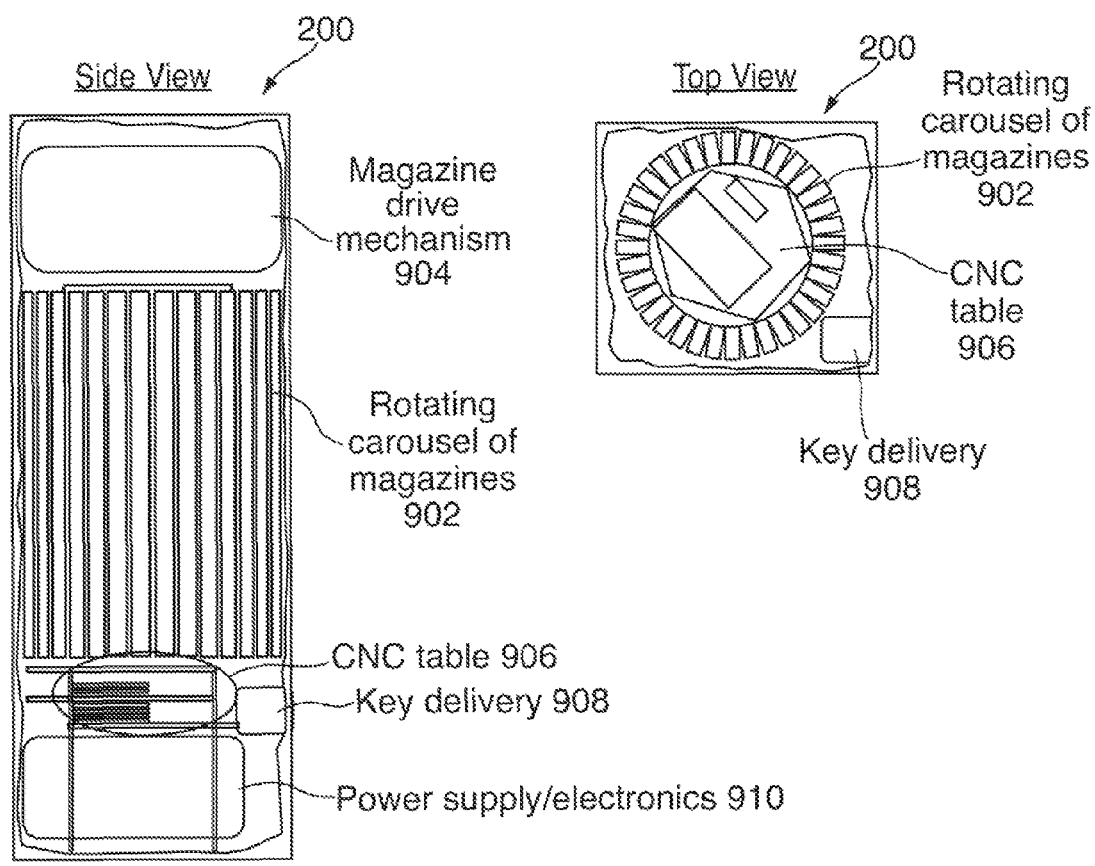
FIG. 9B shows an illustrative example of a rotating carousel of magazines installed in a system for duplicating keys in accordance with some embodiments of the disclosed subject matter.

In some embodiments, the magazines holding stacks of inventoried key blanks can be placed on a rotating carousel. An illustrative example is shown in FIGS. 9a and 9b. Such an embodiment can allow for a greater number of magazines, and correspondingly unique key types, within a given kiosk volume compared with a mounted set of static magazines. Alternatively, key movement mechanism 114 can rotate to reach surrounding magazines to achieve a similar result of accommodating a large number of magazines inside the small interior of a kiosk, in some embodiments.

Figure 10:
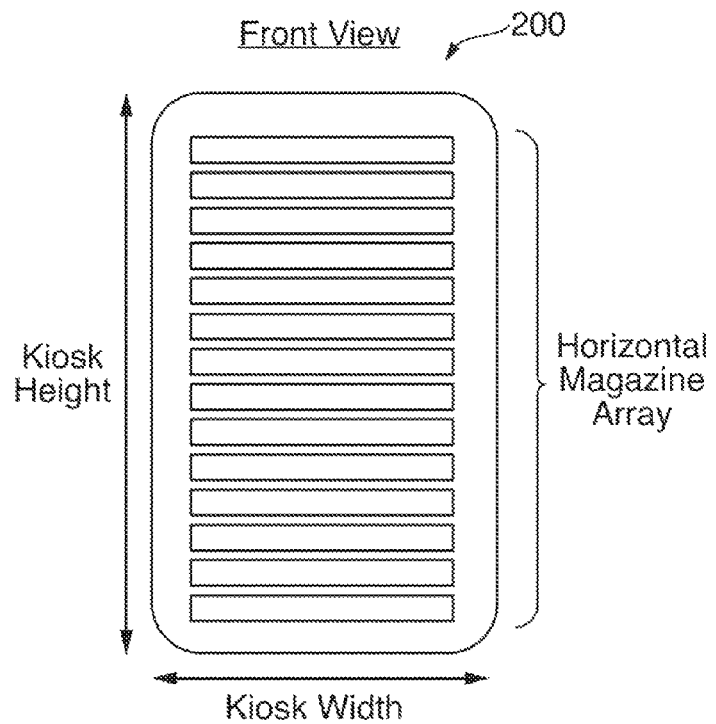
FIG. 10 shows an illustrative example of a kiosk with horizontally installed magazines in accordance with some embodiments of the disclosed subject matter.

In some cases in which the kiosk height is greater than its width, for example, magazines can be aligned horizontally so that the number of magazines which can be accommodated is increased in some embodiments. This can allow for more types of keys to be stocked, for example, in a kiosk having a limited footprint. An illustrative example is in FIG. 10. In some embodiments, a passive push mechanism (e.g., a spring or springs) or active push mechanism (e.g., a screw mechanism, a conveyer, etc.) can apply pressure to the horizontally stacked key blanks and the blanks can be retrievable by key movement mechanism 114 at one or both sides of each stack.

Figure 11A:
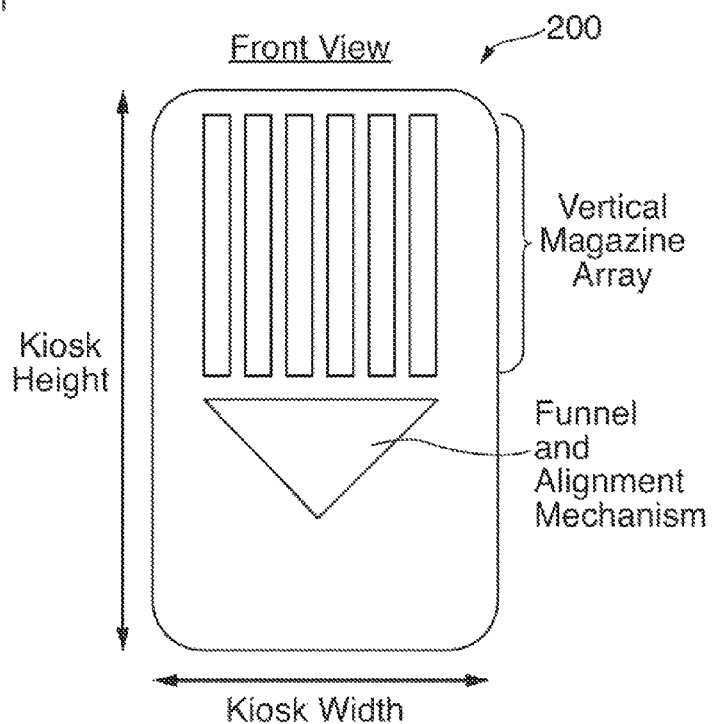
FIG. 11A shows an illustrative example of a kiosk with vertically installed magazines and a funnel and alignment mechanism in accordance with some embodiments of the disclosed subject matter.
Figure 11B:
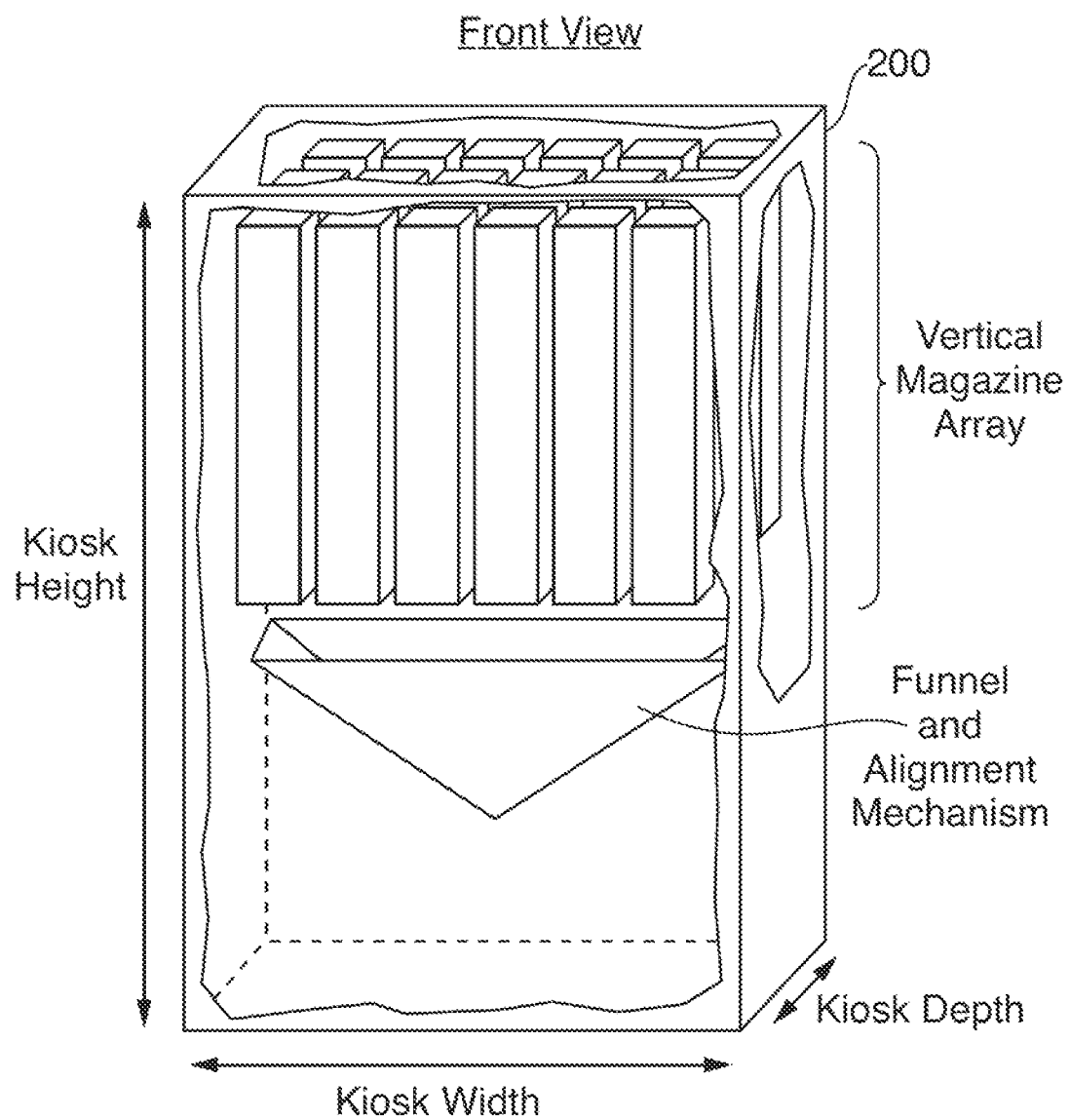
FIG. 11B shows an illustrative example of a perspective view of a kiosk with multiple rows of vertically installed magazines and a funnel and alignment mechanism in accordance with some embodiments of the disclosed subject matter.

In some embodiments, key blanks can be dispensed from the magazines (using any suitable mechanism) into a funnel and alignment mechanism where they can be properly oriented and then retrieved by key movement mechanism 114. It should be noted that the funnel and alignment mechanisms along with mechanisms for dispensing blanks from the magazines can be thought of as part of key movement mechanism 114, in some embodiments. An illustrative example is shown in FIG. 11A. Such a method can allow for significant freedom in the placement of magazines within the kiosk, so that a large number of magazines can be accommodated. For example, magazines can be arranged in a two dimensional array. FIG. 11B shows an illustrative example of a perspective view of kiosk 200 in which the vertical magazines can be arranged in rows from one side of kiosk 200 to the other and in rows from the front of kiosk 200 toward the back of kiosk 200. Alternatively, the magazines can be arranged in any suitable configuration that allows blanks stored in the magazines to be dispensed into the funnel and alignment mechanism included in key movement mechanism 114 to be oriented and then retrieved by a key gripping and moving mechanisms that is included in key movement mechanism 114.

Figure 12:
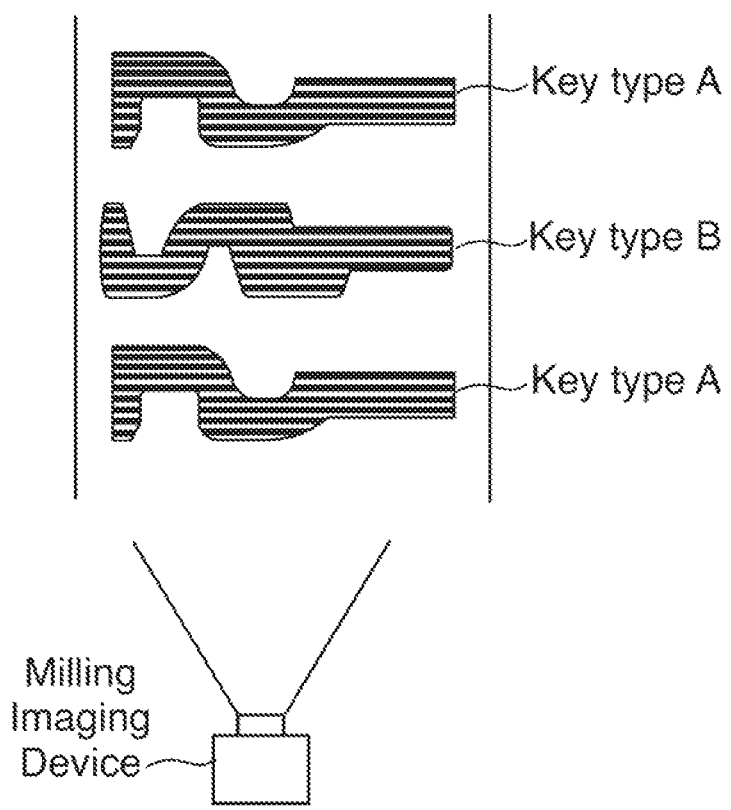
FIG. 12 shows an illustrative example of different key types arranged in one magazine in accordance with some embodiments of the disclosed subject matter.

In some embodiments, each magazine can contain an inventory of multiple key types so that the number of magazines does not restrict the number of key types which can be accommodated in a kiosk. An illustrative example is shown in FIG. 12. In this embodiment, a key type detection method (e.g., optical imaging), can be used to identify the location of a given blank type within a magazine. Key movement mechanism 114 can then retrieve a required key blank type from an appropriate location within the magazine.

Key cutting and cleaning mechanism 116 can be any suitable mechanism for cutting and cleaning a key. For example, key cutting and cleaning mechanism 116 can include a key blank holding mechanism, a cutting tool, a deburring tool, a scrap metal guard and debris container, and/or any other suitable key cutting and/or key cleaning device. In some embodiments, various parts described herein can be part of a computer numerical control (CNC) machine used to create a duplicate key. For example, mechanisms 114 and 116 combined can together be part of a CNC machine that can be precisely controlled. For example, such a CNC machine can have a key blank holding mechanism attached one or more belts and/or stabilizing bars that can receive a blank key from key storage area 118. The key blank holding mechanism of the CNC machine can then be moved with the blank key to a cutting blade of the cutting tool under the control of the hardware processor and cause the key to be cut according to specifications. After a key is cut, the CNC machine can then move the blank key to the deburring tool to be cleaned of burrs that can result from the cutting process. After deburring is complete, the holding mechanism can release the new key into a key dispensing chute where it can be retrieved by the user.

As another example, mechanism 116 can include a CNC machine having a robotic arm that can be precisely controlled. A key blank holding mechanism can be attached to the end of such a robotic arm that can be used to retrieve a key from key movement mechanism 114 (e.g., the funnel and alignment mechanism described above). The robotic arm of the CNC machine can then move the blank key to a cutting blade of the cutting tool under the control of the hardware processor and cause the key to be cut according to specifications. After a key is cut, the CNC machine can then move the blank key to the deburring tool to be cleaned of burrs that can result from the cutting process. After deburring is complete, the holding mechanism can release the new key into a key dispensing chute where it can be retrieved by the user.

A scrap metal guard and debris container can include one or more flaps surrounding the cutting blade. These flaps can contain and direct scrap metal generated during the cutting process to the scrap metal container. This container can be located below the cutting tool. The container can be easily accessible to facilitate convenient removal of scrap metal during routine maintenance.

In some embodiments, a key can be replicated by an additive manufacturing process such as three-dimensional printing, whereby a new key is fabricated by laying successive layers of an inventoried material to the desired specifications. Such a technique can allow for the duplication of a large number of different key types and can negate the need for inventoried blank keys.

In some embodiments, keys can be replicated from a sheet, bar or coil of metal (generally referred to herein as "stock"). For example material to create a new key can be removed from the stock as needed. Any suitable technique can be used for removing a required amount of material from the stock to create a new key. For example, a required amount of material can be removed from the stock by stamping. As another example, a required amount to material can cut from the stock using any suitable technique (e.g., cut with a blade, milled, cut with a laser, cut with a plasma tool, a water jet cutting tool, etc.). The material removed from the stock can then be shaped into a new key using any suitable techniques. For example, the CNC machine described above can be used to shape a new key from material removed from the stock. Such a technique can allow for the duplication of a large number of different key types and can negate the need for inventoried blank keys.

In some embodiments, keys can be replicated from a material such as hard plastic (e.g., thermoplastics or thermosetting polymers, such as, polyethylene, polypropylene, polystyrene, polyvinyl chloride, and polytetrafluoroethylene, etc., polyvinyl chloride (PVC), or any other suitable plastic). In such an embodiment, a block (or blocks) of such a plastic can be stored to be used to replicate keys. A required amount of material for replicating a key can be removed from the block as required and can be shaped into an appropriate shape for replicating a particular key. Such a technique can allow for the duplication of a large number of different key types and can negate the need for inventoried blank keys. In other embodiments, key blanks can be made of plastic rather than metal. Using plastic rather than metal to replicate keys can allow for keys to be replicated that can be easily and safely disposed of by a user after the key has fulfilled a particular purpose. For example, if the user gets locked out of their home, the user can create a replica key from plastic and retrieve the original key. The user can then dispose of the plastic replica key (e.g., by cutting up or shredding the key) so that there are not multiple unused copies of the key for the user to keep track of. Using plastic can also allow for keys to be more easily created as shaping plastic is generally easier than shaping metal.

Any suitable material can be used for replicating keys using the mechanisms described herein.

In some embodiments, a user can supply an appropriate key blank for replicating a particular key. In such an embodiment, a user can determine a type of key blank required for replicating a particular key and obtain that type of key blank to use in replicating the key. For example, the user can look up the type of key blank using a computer application, mobile application, or web platform. In some cases a user can buy a blank of the required type at a retail location (e.g., a hardware store), or blanks can be available at a location where the kiosk for replicating keys is located where the user can select a key blank herself or acquire the appropriate blank from an attendant (e.g., a clerk). When the user has acquired the appropriate blank type, the user can supply the blank to the mechanism for replicating the key. In such an embodiment, the mechanism can verify that the blank supplied by the user is the correct type of blank for the particular key to be replicated. This can be done by capturing one or more images of the blank, or by using any other suitable technique for determining the properties of the blank, such as the techniques for determining the properties of a key described herein. Such a technique can allow for the duplication of a large number of different key types and can negate the need for inventoried blank keys.

Figure 3:
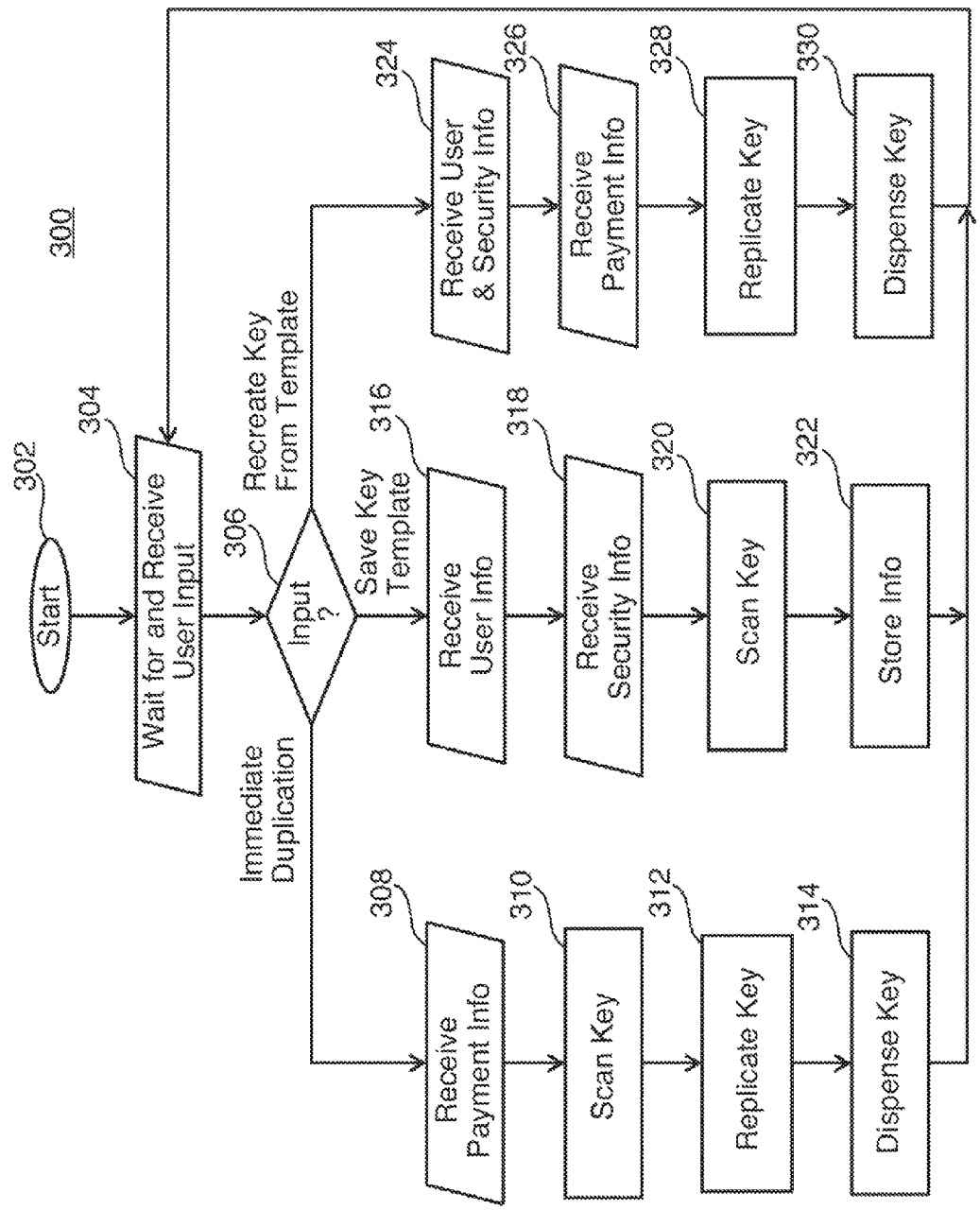
FIG. 3 shows an illustrative example of a process for duplicating keys in accordance with some embodiments of the disclosed subject matter.

Turning to FIG. 3, an example of a process 300 that can be used to control the creation of keys by hardware, such as hardware 100 of FIG. 1, is illustrated in accordance with some embodiments. This process can be executed in hardware processor 110.

As shown, after process 300 begins at 302, the process can receive a user input of an action to be taken. For example, in some embodiments, this action can be to immediately create a duplicate of a key, to save a template of a key, or to recreate a key from a template. Any other actions can additionally or alternatively be taken in some embodiments. This user input can be received in any suitable manner. For example, in some embodiments, this user input can be specified by the user pressing a button on a touch screen interface, by a user inserting a key in to a key detector, by a user swiping a finger on a fingerprint reader or scanning an eye with a retina scanner, and/or by the user taking any other suitable action.

If the user selects to immediately duplicate a key, then process 300 can branch at 306 to 308 where payment information can be received. Any suitable mechanism for receiving payment information can be used. For example, in some embodiments, credit card information can be entered via user input device(s) 104. As another example, in some embodiments, an electronic device (such as a mobile phone) can be brought into proximity or tapped against a user input device 104. As yet another example, payment information can be received as an electronic message received via communication network interface 112. As still another example, input device(s) 104 can scan an image presented by the user that contains payment information such as an account number, etc. In such an example, the payment information can be encoded in the image so that it is difficult or impossible for a human to discern the payment information with the naked eye.

Next, at 310, process 300 can scan a key presented by the user. Any suitable approach to scanning a key can be used in some embodiments. For example, a key can be scanned as described below in connection with FIGS. 4-7. This key scanning can detect the key bitting pattern and/or the key blank type in some embodiments.

Then, at 312, process 300 can replicate the scanned key. This replication can be performed in any suitable manner. For example, in some embodiments, the key can be replicated by the hardware processor 110: (a) controlling the key movement mechanism 114 to retrieve an appropriate key blank from a key repository and move the key to the key cutting and cleaning mechanism 116; and (b) controlling the key cutting and cleaning mechanism 116 to cut the key according to the detected bitting pattern and then clean the key to remove burrs, etc.

Finally, at 314, the process can cause the key to be dispensed to a user. For example, the hardware processor can control the key cutting and cleaning mechanism 116 to drop the key in the key dispensing chute.

If the user selects to save a key template, then process 300 can branch at 306 to 316 where user information can be received. Any suitable user information can be received, and this information can be received in any suitable manner, in some embodiments. For example, in some embodiments, a user name, a key name, a user physical address, a user phone number, a user credit card number, a user identification number (e.g., social security number, driver's license number, passport number, etc.), a user name, a user email address, and/or any other suitable user information can be received using one or more user input device(s) 104. In some embodiments, receiving user information can be omitted from process 300.

At 318, process 300 can then receive security information. Any suitable security information can be received and this information can be received in any suitable manner, in some embodiments. For example, in some embodiments, a user password, a user spoken word, a user fingerprint scan, a user retina or iris scan a face image, a DNA sample, a palm print, a hand geometry measurement and/or any other suitable security information can be received using one or more user input device(s) 104. In some embodiments, receiving security information can be omitted from process 300.

Next, at 320, process 300 can scan a user's key. Any suitable approach to scanning a key can be used in some embodiments. For example, a key can be scanned as described below in connection with FIGS. 4-7. This key scanning can detect the key bitting pattern and/or the key blank type in some embodiments.

Finally, at 322, the information received at 316, 318, and/or 320 can be stored. This information can be stored in any suitable manner and at any suitable location. For example, in some embodiments, this information can be stored in storage 108. As another example, in some embodiments, this information can be transmitted via communication network interface 112 to a remote storage device. As yet another example, in some embodiments, some information can be stored locally and some information can be stored remotely. In some embodiments, any suitable security procedures can be performed in connection with storing the information. For example, in some embodiments, the information can be encrypted prior to being stored. The information stored at 322 can then later be accessible by the same hardware and/or any other suitable hardware. For example, if a first kiosk is used to save a key template, a second kiosk can be configured to recreate a key from that template in some embodiments. Such a second kiosk can be nearby or remote from the first kiosk.

In some embodiments, a user can have the option to save key information after immediately creating a duplicate key. In such a case, if a user elects to save the key information, similarly to what is described above in connection with 316, 318, and 322, the user can be prompted to enter user information and/or security information and that information, along with the bitting pattern and key blank type information, can be stored. If a user does not choose to save key information after immediate duplication, or if the option to do so is not presented to the user, the key information can be deleted to protect the security of the user.

In some embodiments, information on a key type and bitting information of a key provided by the user can be sent to the user in addition to, or instead of, being stored in storage device 108. For example, the information can be sent to the user by e-mail, text message, mail, or any other suitable manner of sending the information. This can allow for a user to have access to the information on the type of key and bitting information without relying on storage 108. In a case where the information is not stored in storage 108, this can allow a user that is especially concerned with privacy to know that information required to create a replica of the key is not stored with personal information of the user.

In some embodiments, when a key is scanned at 320, an anonymous entry can be created corresponding to the key and the entry can be assigned an index number. The index number, bitting information, key type information, and/or information entered by a user (e.g., a password, a pin number, etc.) can be used to create a unique number that corresponds to the key. The user can then use the unique number to obtain a replica of the key, or give the unique number to another user so that the second user can obtain a replica of the key. This can allow for a user that is especially concerned with privacy to know that information required to create a replica of the key is not stored with personal information of the user, because the entry corresponding to the key is anonymous.

In some embodiments, a user can have the option to immediately create a duplicate key after saving a key template. In such a case, if a user elects to create a duplicate key, similarly to what is described above in connection with 308, 312, and 314, the user can be prompted to enter payment information and the key can be replicated and dispensed.

If the user selects to recreate a key from a template (e.g., because the user has lost his or her key), then process 300 can branch at 306 to 324 where user and security information can be received. Any suitable user information and/or any suitable security information can be received, and this information can be received in any suitable manner, in some embodiments. For example, this information can be received to securely identify the user and/or the key. More particularly, this information can include a user name and a password, a fingerprint scan, a face image capture, a credit card swipe, a key name for a previously stored key template, any other suitable information, or any suitable combination thereof. As an even more particular example, the user can be prompted to select a key from the list of those that were previously stored. Such a list can include descriptive names entered during a key template storage process, key images, etc.

Next, at 326, payment information can be received. Any suitable mechanism for receiving payment information can be used. For example, in some embodiments, credit card information can be entered via user input device(s) 104. As another example, in some embodiments, an electronic device (such as a mobile phone) can be brought into proximity or tapped against a user input device 104. As yet another example, payment information can be received as an electronic message received via communication network interface 112.

Then, at 328, process 300 can replicate the desired key. This replication can be performed in any suitable manner. For example, in some embodiments, they key can be replicated by the hardware processor 110: (a) controlling the key movement mechanism 114 to retrieve an appropriate key blank from a key repository and move the key to the key cutting and cleaning mechanism 116; and (b) controlling the key cutting and cleaning mechanism 116 to cut the key according to the stored bitting pattern and then clean the key to remove burrs, etc.

Figure 8:
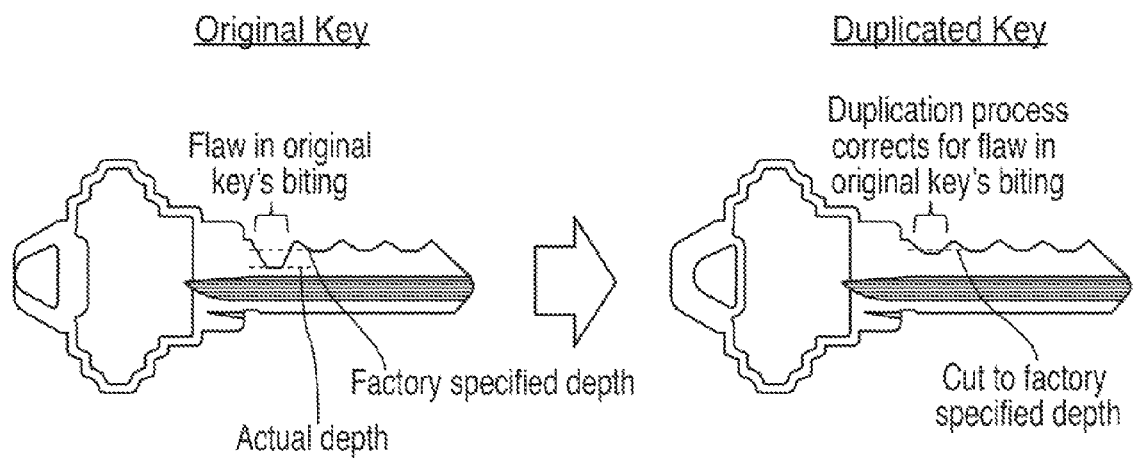
FIG. 8 shows an example illustrating the concept of returning a key bite pattern to factory specifications when making a duplicate key in accordance with some embodiments of the disclosed subject matter.

In some embodiments, the bitting pattern from the originally scanned key can be compared to a database of known bitting specifications for keys and locks. From this comparison, an inference can be made as to the factory specifications of the bitting of the to-be-copied key. When a duplicate is created, it can be cut to these factory specifications instead of merely replicating the original key's bitting profile. This allows for correction of flaws in the original key resulting from wear-and-tear, previous duplications, or other ca uses. An example of this is shown in FIG. 8. In doing so, a duplicated key can be more accurate than a previous copy. Additionally or alternatively, a user can identify the type of lock that the key is for by entering a make and/or model of the lock. The make and/or model of the lock can be compared to a database to determine factory specifications corresponding to the lock type and key identified by the user, and the duplicate can be replicated using the original bitting profile as described above.

In addition to correcting for imperfections in a key's bitting depths during a duplication, other imperfections in a previous key can also be corrected. For example, the bitting platform length, the platform spacing, the platform offset, localized deformations, and/or bitting angles can be corrected in some embodiments. In some embodiments keys at custom, non-factory specifications can additionally be produced.

Finally, at 330, the process can cause the key to be dispensed to a user. For example, the hardware processor can control the key cutting and cleaning mechanism 116 to drop the key in the key dispensing chute.

In some embodiments, a subset of what is shown in process 300 can be used. For example, when hardware 100 is implemented as a scan-only kiosk, only steps 316, 318, 320, and 322 can be performed by a corresponding process.

It should be understood that some of the above steps of the flow diagram of FIG. 3 can be executed or performed in an order or sequence other than the order and sequence shown and described in the figure. Also, some of the above steps of the flow diagram of FIG. 3 can be executed or performed substantially simultaneously where appropriate or in parallel to reduce latency and processing times.

Referring to FIGS. 4-7, key scanning in accordance with some embodiments is further described.

Figure 4A:
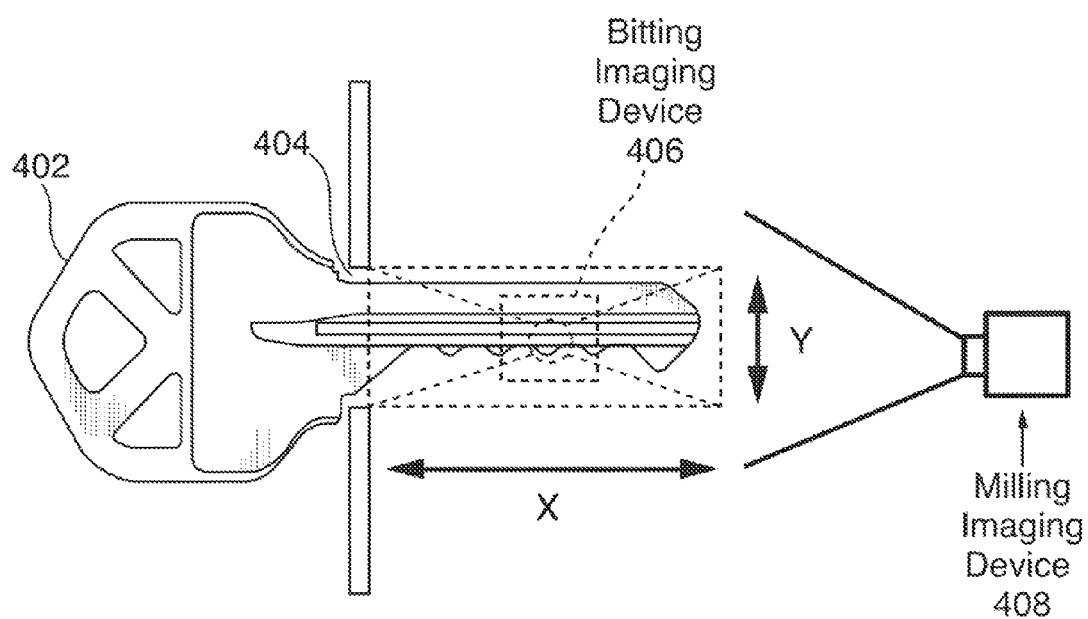
FIG. 4A shows an illustrative example of a scanning arrangement for capturing geometric information about a key in accordance with some embodiments of the disclosed subject matter.

As shown in FIG. 4A, in order to be scanned, a key 402 can be inserted by a user into a slot 404. The key scanning slot can be able to accommodate a variety of blank types with varying lengths, widths, and shapes. The key scanning slot can properly position the key to ensure the scanning process is successful. The key scanning slot can be positioned at a downward angle so that the key gravity will assist the user in ensuring that the key is inserted fully. The key scanning slot can allow a user to maintain contact with the handle of the key at all times in some embodiments. The key scanning slot can permit the key to remain attached to a keychain (or key ring, or any other key retention device) during key scanning.

Figure 4B:
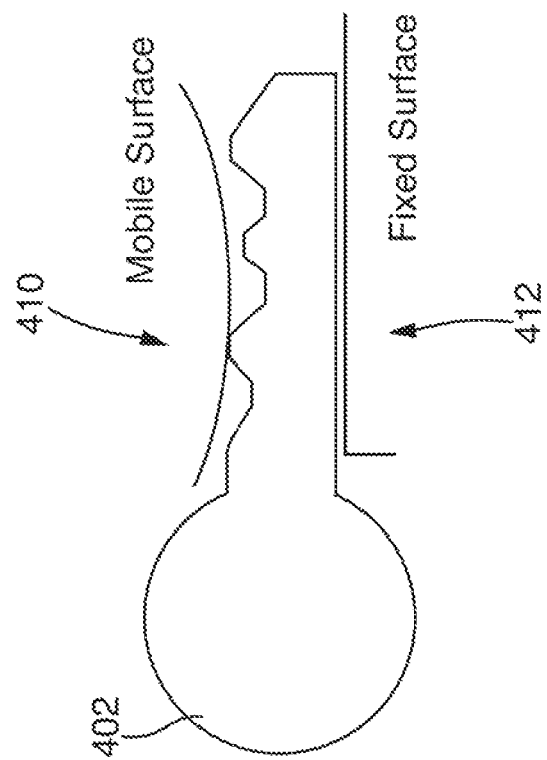
FIG. 4B shows an illustrative example of a mechanisms for holding a key in a particular position while geometric information about the key is captured in accordance with some embodiments of the disclosed subject matter.
Figure 4B:
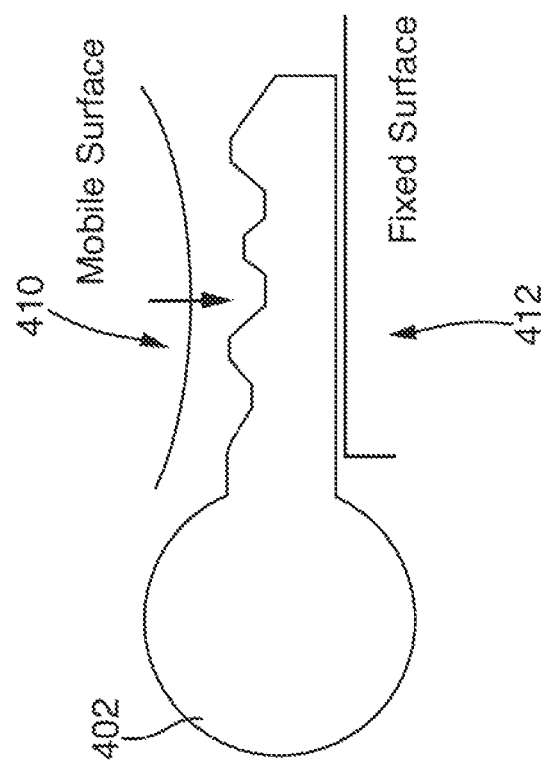

As shown in FIG. 4B, key 402 can be fixed in position between a mobile surface 410 and a fixed surface 412 while key 402 is being scanned in accordance with some embodiments. In such an embodiment, the force from mobile surface 410 applied to the teeth of key 402 can fix key 402 in place against fixed surface 412. This can allow for keys to be scanned to be aligned in the same position each time a key is inserted and ensure that there is no movement of the key when geometric information about the key is being scanned.

Figure 5:
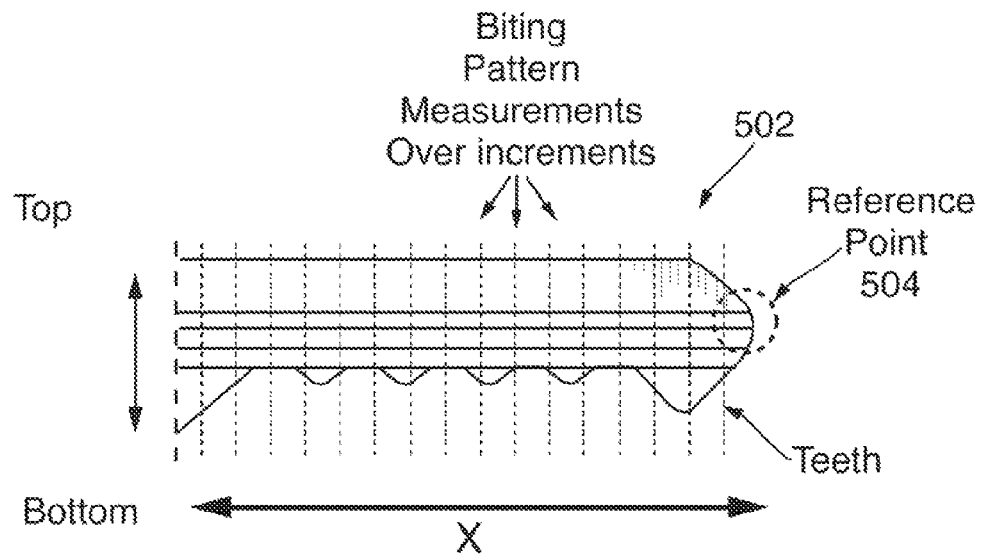
FIG. 5 shows an illustrative example of geometric information about a key captured from a side view of the key in accordance with some embodiments of the disclosed subject matter.
Figure 6:
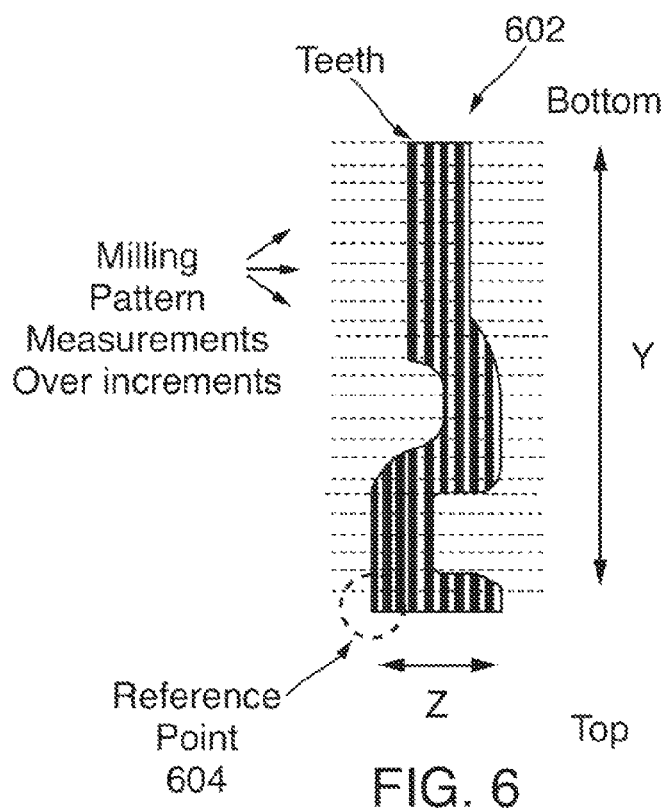
FIG. 6 shows an illustrative example of geometric information about a key captured from an end view of the key in accordance with some embodiments of the disclosed subject matter.

Once in the slot, one or more imaging devices 406 and 408 can be used to optically detect a bitting pattern and a key blank type of the key in some embodiments. For example, as shown in FIG. 5, an imaging device 406 can be used to capture an image 502 of key 402. As another example, as shown in FIG. 6, an imaging device 408 can be used to capture an image 602 of key 402. Using these two images, parameters unique to each key can be detected in order to correctly determine both the bitting pattern and key blank type of the key.

In order to do so, in some embodiments, a thresholding algorithm, such as Otsu's Method (described, for example, in N. Otsu, "A thresholding selection method from gray level histogram", IEEE Trans. on Systems, Man and Cybernetics, 9 (1), 62-66, January 1979, which is hereby incorporated by reference herein in its entirety), can first be used to pre-process the images and remove any spectral noise data. Then, once pre-processing of both images has been accomplished, a corner detection algorithm, such as Harris' Method (described, for example, in C. Harris and M. J. Stephens. "A combined corner and edge detector", Alvey Vision Conference, pages 147-152, 1988, which is hereby incorporated by reference herein in its entirety), can be used to detect reference points 504 and 604 in images 502 and 602, respectively.

As shown in FIG. 6, point 604 can be the left-most, lower corner of the key. From this point, width variations in the z-axis of the key can be measured over regular increments along the y-axis. These width variations can be compared to known key blank data to determine a key blank type (or milling type). This data can be used to select the appropriate blank type during the key replication.

As shown in FIG. 5, point 504 can be the tip of the key end. From this point, height variations in the y-axis of the key can be measured over regular increments along the x-axis. These height variations can be used to determine the bitting pattern of the key and to cut the key during the key replication.

Machine learning algorithms can also be employed to improve the accuracy and capabilities of the machine vision software.

In some embodiments, a laser-based mechanism, for detecting a milling type and a bitting pattern of a key can be used. Such a laser-based mechanism can be used to scan a key and detect the outline of the key from each of the perspectives illustrated in FIGS. 5 and 6.

Figure 7:
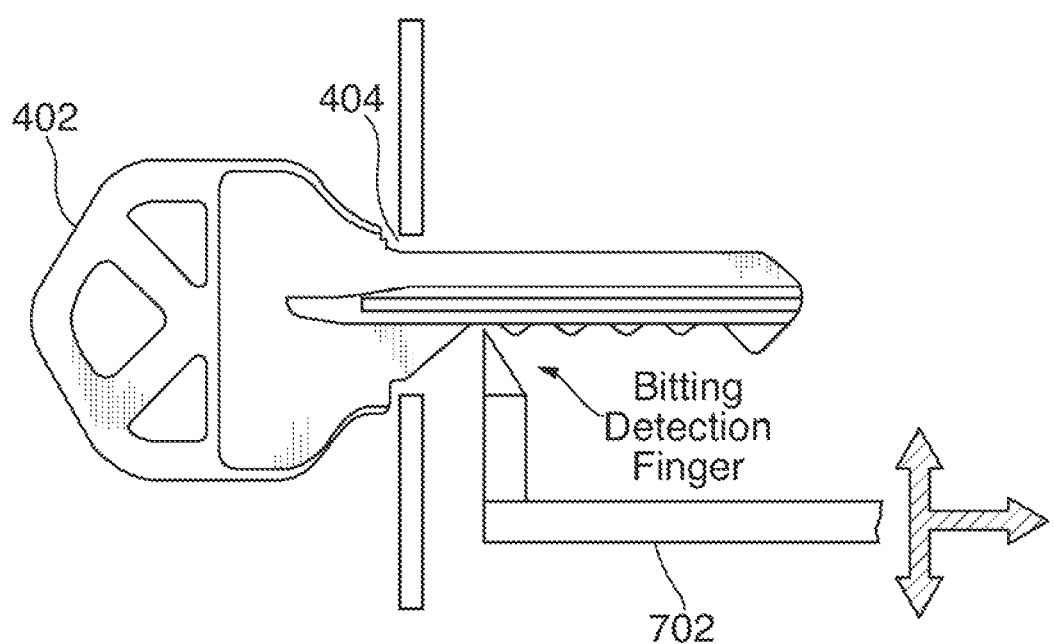
FIG. 7 shows an illustrative example of a physical scanning arrangement for capturing geometric information about a key in accordance with some embodiments of the disclosed subject matter.

As described above, additionally or alternatively to detecting the bitting pattern and the blank type optically, a mechanical mechanism can be used to detect one or more of these features of a key. For example, as shown in FIG. 7, a bitting detection finger 702 can be used to detect the bitting of a key. More particularly, for instance, the movement of the finger can be detected by suitable electromechanical sensors as key 402 is entered into slot 404. As another more particular example, the finger can be moved automatically along the key after the key has been inserted into the slot and the bitting pattern detected based on up and down movements of the finger as detected by a suitable electromechanical sensor.

In some embodiments, rather than detecting key blank type (or milling type) as described above, a dedicated key slot for each key type available can be used. In such a case, upon entering a key into a key slot, the key blank type can be determined simply from the fact that the key fits into the slot.

In some embodiments, a tray can be provided where a user can place a key to be scanned. Such a tray can be provided in lieu of or in addition to slot 404. Such a tray can allow for irregularly shaped keys (e.g., tubular keys, four sided keys, Zeiss keys, skeleton keys, etc.) that may not fit into slot 404 to be scanned by the kiosk using any suitable technique, such as the techniques described herein.

In some embodiments, a key to be replicated can be held in front of a particular location on a kiosk where the key can be scanned. This can allow for irregularly shaped keys (e.g., tubular keys, four sided keys, Zeiss keys, skeleton keys, etc.)

that may not fit into slot 404 to be scanned by the kiosk using any suitable technique, such as the techniques described herein.

In some embodiments, any other suitable mechanisms for detecting bitting patterns and/or key blank type can be used in some embodiments. For example, in some embodiments, key bitting can be detected by: many small mechanical pins which are pushed by key bitting and the pin positions get detected by suitable electromechanical sensors; one or more LED and/or photodiode arrays which detect obstruction created by the key bitting; micro air flow detectors which detect obstructions caused by bitting; heat sensors which detect obstructions caused by bitting; ultrasonic distance sensors; etc.

In some embodiments, in addition to a key being scanned using one or more key detector(s) 106 as described above, a key can be scanned using any other suitable device(s). For example, in some embodiments, a key can be scanned using any optical detector, scanner, camera, mobile phone, smartphone, tablet computer, etc. In such embodiments, for example, a user can be able to photograph a key and supply one or more corresponding images to hardware processor 110 (or any other suitable hardware processor) so that the hardware processor can process the image(s) to detect the key's bitting pattern and/or key blank type. In some embodiments, the image(s) can contain reference objects, such as a quarter, in order to determine the size of the key.

In some embodiments, users can scan a key on their smartphone or tablet computer. Furthermore, in some embodiments, an application can be downloaded to assist users in capturing quality images of their key. From a mobile application or website platform, users can also request a duplicate of their scanned key be sent via mail to an address of their choosing, in some embodiments.

In some embodiments, a user can also authorize others to access their key information using the mobile application or website platform. Authorized recipients can use the digital key information to request a physical copy via mail order, create a physical copy at a kiosk, or make a physical copy with any suitable key duplication hardware. For example, in some embodiments, when a user is locked out, that person can retrieve his/her key type and bitting code information from the mobile application or website platform, enabling any operator of a suitable key duplication machine to create a copy without the physical presence of the original.

In some embodiments, a user can retrieve his/her key type and bitting code information from the mobile application or website platform, and order a duplicate key to be delivered to the user based on location information provided to the mobile application or website platform. For example, the location information can be provided using a mobile phone equipped with a Global Positioning System (GPS) receiver. As another example, a user can specify coordinates where the duplicate key is to be delivered. As yet another example, a user can specify an address where the duplicate key is to be delivered. The order for the duplicate key ordered by the user can be received by a key duplicating service. The key duplicating service can then use the key type and bitting information to create a duplicate key and can deliver the duplicate key to the user at the specified location. Additionally, the user can use the application or website platform to pay for the duplication and delivery of the duplicate key to their location.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, BLU-RAY discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid, of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed:

1. A system for creating keys, the system comprising:
a first kiosk comprising:
a key scanner that captures first geometric information about a first key and captures second geometric information about a second key; and
a first hardware processor that:
receives first security information specified by a first particular user and identifying the first particular user;
automatically determines a key type of the first key from a plurality of known key types based on the captured geometric information about the first key;
automatically determines bit heights of the first key based on the captured geometric information about the first key;
causes the first geometric information, including the key type of the first key and the bit heights of the first key, and first identifying information based on the first security information to be stored at a remote storage device;
receives second security information specified by a second particular user and identifying the second particular user;
automatically determines a key type of the second key from the plurality of known key types based on the captured geometric information about the second key;
automatically determines bit heights of the first key based on the captured geometric information about the second key; and
causes the second geometric information, including the key type of the second key and the bit heights of the second key, and second identifying information based on the second security information to be stored at a remote storage device;
a second kiosk comprising:
a second hardware processor that:
receives third security information, wherein the third security information corresponds to the first identifying information but not the second identifying information;
verifies that the third security information corresponds to the first identifying information;
identifies first stored geometric information about one or more keys that can be made in response to verifying that the third security information corresponds to the first security information, wherein the first stored geometric information includes the first geometric information but does not include the second geometric information; and receives the first geometric information from the remote storage device based on the verification that the third security information corresponds to the first security information; and a first key shaping device that creates a third key using the first geometric information, including the key type of the first key and the bit heights of the first key; and a third kiosk comprising:

a third hardware processor that:

receives fourth security information, wherein the fourth security information corresponds to the second identifying information but not the third identifying information;

verifies that the fourth security information corresponds to the second identifying information;

identifies second stored geometric information about one or more keys that can be made in response to verifying that the fourth security information corresponds to the second security information, wherein the second stored geometric information includes the second geometric information but does not include the first geometric information; and receives the second geometric information from the remote storage device based on the verification that the fourth security information corresponds to the second security information; and a second key shaping device that creates a fourth key using the second geometric information, including the key type of the second key and the bit heights of the second key.

2. The system of claim 1, wherein the remote storage device is a server.

3. The system of claim 1, wherein the remote storage device is a portable electronic device.

4. The system of claim 1, wherein the second kiosk further comprises an input device, and wherein the second hardware processor also:

indicates to the user an identity of the one or more keys for which geometric information is stored in the first stored geometric information using a display coupled to the second hardware processor upon verifying the third security information; and receives an identification from the input device of a key to create from the displayed identity information.

5. The system of claim 4, wherein the input device comprises at least one of the following: a biometric sensor, a keypad, a keyboard, a touchscreen, an image sensor, and a near-field communication receiver.

6. The system of claim 1, wherein each of the first security information, the second security information, the third security information, and the fourth security information comprises at least one of the following: a username, a password, biometric information of the user, a barcode, a Quick Response code, a radio signal encoded with account information, and a light signal encoded with account information.

7. The system of claim 1, wherein the third key is created from a key blank stored in one of a plurality of magazines that are each configured to hold a plurality of key blanks 8. The system of claim 7, wherein the plurality of magazines are arranged on a rotating carousel.

9. The system of claim 1, wherein the first key shaping device comprises:

a computer numerical control device; and a shaping tool.

10. The system of claim 1, wherein the first key shaping device comprises an additive manufacturing device, and wherein the third key is created from material used by the additive manufacturing device.

11. The system of claim 1, wherein a material used to create the third key includes at least one of the following: key blanks, plastic, and stock material.

12. The system of claim 1, further comprising a movement device that moves material used to create the third key from a key material storage area to the first key shaping device.

13. The system of claim 1, wherein the third security information and the first security information contain the same information.

14. The system of claim 1, further comprising a computing device comprising the remote storage device and a fourth hardware processor that receives an instruction from a user device to cause third identifying information based on fifth security information identifying a third particular user to be associated with the first geometric information; and wherein the second hardware processor is configured to:

receive sixth security information that corresponds to the third identifying information but not to the first identifying information and not to the second identifying information;

verify that the sixth security information corresponds to the third identifying information and that the third identifying information is associated with the first geometric information;

identify the first stored geometric information that includes the first geometric information in response to verifying that the sixth security information corresponds to the third identifying information;

receive the first geometric information from the storage device in response to verifying that the sixth security information corresponds to the third identifying information; and cause a fifth key to be created using the first geometric information.

15. The system of claim 1, wherein the key scanner comprises at least one of the following: a camera, a laser-based measuring device, a bitting detection finger, a plurality of mechanical pins, and a plurality of light sources and light detectors.

16. A system for creating keys, the system comprising:

a computing device comprising:

a storage device; and a first hardware processor that:

receives first geometric information about a first key from a first source, wherein the first geometric information includes a first key type of the first key and first bit heights of the first key determined based on geometric information about the first key captured at the first source;

receives first identifying information identifying a first particular user based on first security information specified by the first particular user in connection with the first geometric information;

causes the first geometric information and the first identifying information to be stored at the storage device;

receives second geometric information about a second key from a second source, wherein the second geometric information includes a second key type of the second key and second bit heights of the second key determined based on geometric information about the second key captured at the second source;

receives second identifying information identifying a second particular user based on second security information specified by the second particular user in connection with the second geometric information; and causes the second geometric information and the second identifying information to be stored at the storage device;

a first kiosk comprising:
  a first communication network interface; and
  a second hardware processor that:
    receives third security information, wherein the third security information corresponds to the first identifying information but not the second identifying information;
    verifies that the third security information corresponds to the first identifying information;
    identifies first stored geometric information about one or more keys that can be made in response to verifying that the third security information corresponds to the first security information, wherein the first stored geometric information includes the first geometric information but does not include the second geometric information; and
    receives the first geometric information from the storage device using the first communication network interface based on the verification that the third security information corresponds to the first security information; and
  a first key shaping device that creates a third key based on the first geometric information, including the first key type and the first bit heights; and a second kiosk comprising:
  a second communication network interface;
  a third hardware processor that:
    receives fourth security information, wherein the fourth security information corresponds to the second identifying information but not the first identifying information;
    verifies that the fourth security information corresponds to the second identifying information;
    identifies second stored geometric information about one or more keys that can be made in response to verifying that the fourth security information corresponds to the second security information, wherein the second stored geometric information includes the second geometric information but does not include the first geometric information; and
    receives the second geometric information from the storage device using the second communication network interface based on the verification that the fourth security information corresponds to the second security information; and
  a second key shaping device that creates a fourth key based on the second geometric information, including the second key type and the second bit heights.

17. The system of claim 16, wherein the communication network interface includes a wireless network interface.

18. The system of claim 16, wherein the first key type and the first bit heights are determined using machine learning techniques to recognize features of the first key based on the geometric information about the first key captured at the first source.

19. A method for creating keys, the method comprising:
  receiving, at a first kiosk, first security information specified by a first particular user and identifying the first particular user;
  capturing, using a key scanner of the first kiosk, first geometric information about a first key;
  automatically determining a key type of the first key from a plurality of known key types based on the first geometric information about the first key;
  automatically determining bit heights of the first key based on the first geometric information about the first key;
  causing, using a first hardware processor of the first kiosk, the first geometric information, including the key type of the first key and the bit heights of the first key, and first identifying information based on the first security information to be stored at a remote storage device;
  receiving, at the first kiosk, second security information specified by a second user and identifying the second particular user;
  capturing, using the key scanner of the first kiosk, second geometric information about a second key;
  automatically determining a key type of the second key from the plurality of known key types based on the second geometric information about the second key;
  automatically determining bit heights of the first key based on the second geometric information about the second key;
  causing, using the first hardware processor of the first kiosk, the second geometric information, including the key type of the second key and the bit heights of the second key, and second identifying information based on the second security information to be stored at the remote storage device;
  receiving, using a second hardware processor of a second kiosk, third security information, wherein the third security information corresponds to the first identifying information but not the second identifying information;
  verifying, using the second hardware processor, that the third security information corresponds to the first identifying information;
  identifying, using the second hardware processor, first stored geometric information about one or more keys that can be made in response to verifying that the third security information corresponds to the first identifying information, wherein the first stored geometric information includes the first geometric information but does not include the second geometric information;
  receiving, using the second hardware processor, the first geometric information from the remote storage device based on the verification that the third security information corresponds to the first security information;
  creating a third key using the first geometric information, including the key type of the first key and the bit heights of the first key;
  receiving, using a third hardware processor of a third kiosk, fourth security information, wherein the fourth security information corresponds to the second identifying information but not the first identifying information;
  verifying, using the third hardware processor, that the fourth security information corresponds to the second identifying information;
  identifying, using the third hardware processor, second stored geometric information about one or more keys that can be made in response to verifying that the fourth security information corresponds to the second identifying information, wherein the second stored geometric information includes the second geometric information but does not include the first geometric information;

receiving, using the third hardware processor, the second geometric information from the remote storage device based on the verification that the fourth security information corresponds to the second security information; and creating a fourth key using the second geometric information, including the key type of the second key and the bit heights of the second key.

20. The method of claim 19, wherein the remote storage device is a server.

21. The method of claim 19, wherein the remote storage device is a portable electronic device.

22. The method of claim 19, the method further comprising:

indicating to the user an identity of the one or more keys for which geometric information is stored in the first stored geometric information using a display coupled to the second hardware processor upon verifying the third security information; and receiving, from an input device coupled to the second hardware processor, an identification of a key to create from the displayed identity information.

23. The method of claim 22, wherein the input device further comprises at least one of the following: a biometric sensor, a keypad, a keyboard, a touchscreen, an image sensor, and a near-field communication receiver.

24. The method of claim 19, wherein each of the first security information, the second security information, the third security information, and the fourth security information comprises at least one of the following: a username, a password, biometric information of the user, a barcode, a Quick Response code, a radio signal encoded with account information, and a light signal encoded with account information.

25. The method of claim 19, wherein the third key is created from a key blank stored in one of a plurality of magazines that are each configured to hold a plurality of key blanks 26. The method of claim 25, wherein the plurality of magazines are arranged on a rotating carousel.

27. The method of claim 19, wherein the third key is created using a key shaping device comprising:

a computer numerical control device; and a shaping tool.

28. The method of claim 19, wherein the third key is created using an additive manufacturing device, and wherein the third key is created from material used by the additive manufacturing device.

29. The method of claim 19, wherein a material used to create the third key includes at least one of the following: key blanks, plastic, and stock material.

30. The method of claim 19, wherein the method further comprises moving material used to create the third key from a key material storage area to a key shaping device.

31. The method of claim 19, wherein the third security information and the first security information contain the same information.

32. The method of claim 19, further comprising:

receiving, using a fourth hardware processor, an instruction from a user device to cause third identifying information based on fifth security information identifying a third particular user to be associated with the first geometric information;

receiving, using the second hardware processor, sixth security information that corresponds to the third identifying information but not to the first identifying information and not to the second identifying information;

verifying, using the second hardware processor, that the sixth security information corresponds to the third identifying information and that the third identifying information is associated with the first geometric information;

identifying, using the second hardware processor, the first stored geometric information that includes the first geometric information in response to verifying that the sixth security information corresponds to the third identifying information;

receiving, using the second hardware processor, the first geometric information from the storage device in response to verifying that the sixth security information corresponds to the third identifying information; and causing a fifth key to be created using the first geometric information.

33. The method of claim 19, wherein the key scanner comprises at least one of: a camera, a laser-based measuring device, a bitting detection finger, a plurality of mechanical pins, and a plurality of light sources and light detectors.

34. A method for creating keys, the method comprising:

receiving, using a first hardware processor, first geometric information about a first key from a first source, wherein the first geometric information includes a first key type of the first key and first bit heights of the first key determined based on geometric information about the first key captured at the first source;

receiving, using the first hardware processor, first identifying information identifying a first user based on first security information specified by the first particular user;

causing, using the first hardware processor, the first geometric information and first identifying information based on the first security information to be stored in a storage device coupled to the first hardware processor;

receiving, using the first hardware processor, second geometric information about a second key from a second source, wherein the second geometric information includes a second key type of the second key and second bit heights of the second key determined based on geometric information about the second key captured at the second source;

receiving, using the first hardware processor, second identifying information identifying a second particular user based on second security information specified by the second particular user;

causing, using the first hardware processor, the second geometric information and second identifying information based on the second security information to be stored in the storage device coupled to the first hardware processor;

receiving, using a second hardware processor, third security information, wherein the third security information corresponds to the first identifying information but not the second identifying information;

verifying, using the second hardware processor, that the third security information corresponds to the first identifying information;

identifying, using the second hardware processor, first stored geometric information of one or more keys that can be made in response to verifying that the third security information corresponds to the first identifying information, wherein the first stored geometric information includes the first geometric information but does not include the second geometric information;

receiving, using a first communication network interface coupled to the second hardware processor, the first geometric information from the storage device based on the verification that the third security information corresponds to the first security information;

creating a third key based on the first geometric information, including the first key type and the first bit heights, received by the second hardware processor;

receiving, using a third hardware processor, fourth security information, wherein the fourth security information corresponds to the second identifying information but not the first identifying information;

verifying, using the third hardware processor, that the fourth security information corresponds to the second identifying information;

identifying, using the third hardware processor, second stored geometric information of one or more keys that can be made in response to verifying that the fourth security information corresponds to the second identifying information, wherein the second stored geometric information includes the second geometric information but does not include the first geometric information;

receiving, using a second communication network interface coupled to the third hardware processor, the second geometric information from the storage device based on the verification that the fourth security information corresponds to the second security information; and creating a fourth key based on the second geometric information, including the second key type and the second bit heights, received by the third hardware processor.

35. The method of claim 34, wherein the communication network interface includes a wireless network interface.

36. The method of claim 34, wherein the first key type and the first bit heights are determined using machine learning techniques to recognize features of the first key based on the first geometric information.

\* \* \* \* \*